US009883424B2

(12) United States Patent  
Hiddink et al.

(10) Patent No.: US 9,883,424 B2
(45) Date of Patent: Jan. 30, 2018

(54) METHOD AND APPARATUS FOR CHANGE OF PRIMARY CELL DURING CARRIER AGGREGATION

(71) Applicant: Google Technology Holdings LLC, Mountain View, CA (US)

(72) Inventors: Gerrit Hiddink, Utrecht (NL); Murali Narasimha, Vernon Hills, IL (US); Ravikiran Nory, Buffalo Grove, IL (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

(21) Appl. No.: 14/881,378

(22) Filed: Oct. 13, 2015

(65) Prior Publication Data

US 2016/0037395 A1    Feb. 4, 2016

Related U.S. Application Data

(62) Division of application No. 13/178,441, filed on Jul. 7, 2011, now Pat. No. 9,210,624.

(Continued)

(51) Int. Cl.
*H04W 36/00* (2009.01)
*H04W 24/04* (2009.01)
*H04W 72/04* (2009.01)

(52) U.S. Cl.
CPC ....... *H04W 36/0044* (2013.01); *H04W 24/04* (2013.01); *H04W 36/0077* (2013.01); *H04W 72/0413* (2013.01); *H04W 72/0446* (2013.01)

(58) Field of Classification Search
None
See application file for complete search history.

(56) References Cited

U.S. PATENT DOCUMENTS

2007/0293224 A1    12/2007    Wang et al.
2009/0232070 A1    9/2009    Muharemovic et al.
(Continued)

FOREIGN PATENT DOCUMENTS

CN      101686534 A      3/2010
WO      2007044414 A1    4/2007
(Continued)

OTHER PUBLICATIONS

International Search Report and Written Opinion for PCT/US2011/043775 dated Nov. 30, 2011.
(Continued)

*Primary Examiner* — Sulaiman Nooristany
(74) *Attorney, Agent, or Firm* — Lerner, David, Littenberg, Krumholz & Mentlik, LLP

(57) ABSTRACT

Methods for performing change of primary cell during carrier aggregation operation are described. A mobile station (MS) receives a message to change a primary cell and to perform a random access communication with a new primary cell. Upon receiving a random access response message from the new primary cell, the MS starts transmitting a control channel to the new primary cell. In one embodiment, the MS releases the configuration of an uplink control channel and transmits uplink control information through an uplink shared channel. Upon completion of the primary cell change procedure, the MS starts transmission of an uplink control channel to the new primary cell.

6 Claims, 3 Drawing Sheets

Related U.S. Application Data

(60) Provisional application No. 61/374,534, filed on Aug. 17, 2010.

(56) References Cited

U.S. PATENT DOCUMENTS

| | | | |
|---|---|---|---|
| 2009/0310563 A1 | 12/2009 | Chou et al. | |
| 2009/0323639 A1* | 12/2009 | Kim | H04W 36/0055 370/331 |
| 2010/0046460 A1 | 2/2010 | Kwak et al. | |
| 2010/0054203 A1 | 3/2010 | Damnjanovic et al. | |
| 2010/0056949 A1 | 3/2010 | Christy | |
| 2010/0222059 A1 | 9/2010 | Pani et al. | |
| 2010/0330999 A1* | 12/2010 | Larsson | H04W 36/08 455/439 |
| 2013/0039321 A1* | 2/2013 | Kim | H04W 72/0413 370/329 |

FOREIGN PATENT DOCUMENTS

| | | |
|---|---|---|
| WO | 2009022860 A1 | 2/2009 |
| WO | 2009099274 A1 | 8/2009 |
| WO | 2010056949 A2 | 5/2010 |

OTHER PUBLICATIONS

3GPP TSG RAN WG2 #70, R2-103254 "PCell and REL8/9 serving cell" Nokia Siemens Networks, Nokia Corporation, Montreal, Canada, May 10-14, 2010; 6 pages.

3GPP TSG RAN WG2 #71, R2-104319 "Primary Cell Change" Samsung, Madrid, Spain; Aug. 22-27, 2010, 2 pages.

3GPP TSG RAN WG2 #71, R2-104509 "Additional Approach for PCell Change" CATT, Madrid, Spain; Aug. 23-27, 2010, 6 pages.

3GPP TSG RAN WG2 #60bis, R2-080247 "Handover failure procedure" Ericsson, Sevilla, Spain; Jan. 14-18, 2008; 6 pages.

3GPP TSG RAN WG2 #70, R2-103171 "Principles for Handover with Carrier Aggregation" Motorola, Montreal, Canada; May 10-14; 3 pages.

3GPP TSG RAN WG2 #70, R2-103912 "[70#11] LTE CA: S-cell activation status after handover" Motorola, Stockholm, Sweeden; Jun. 28-Jul. 2; 6 pages.

International Preliminary Report on Patentability for PCT/US2011/043775 dated Feb. 19, 2013.

Extended European Search Report for EP Application No. 11746341.4 dated Jul. 25, 2013.

Extended European Search Report for EP Application No. 13167526.6 dated Jul. 25, 2013.

TSG-RAN WG2#71 R2-104788, "PCell Change using Reconfiguration procedure", Alcatel-Lucent, Alcatel-Lucent Shanghai Bell, Aug. 23-27, 2010, Madrid, Spain, 6 pages.

3GPP TSG RAN WG2 Meeting #69bis R2-102061, "PCC Change", CATT, Apr. 12-16, 2010, Beijing, China, 5 pages.

3GPP TSG-RAN WG2 #69bis Tdoc R2-101996, "Event handling at PCC change", Ericsson, ST-Ericsson, Apr. 12-16, 2010, Beijing, China, 2 pages.

Chinese Office Action for Application No. 201180039483.0 dated Jan. 16, 2015.

* cited by examiner

METHOD AND APPARATUS FOR CHANGE OF PRIMARY CELL DURING CARRIER AGGREGATION

CROSS-REFERENCE TO RELATED APPLICATIONS

The present application is a divisional of U.S. patent application Ser. No. 13/178,441, filed Jul. 7, 2011, and claims the benefit of the filing date of U.S. Provisional Patent Application No. 61/374,534, filed Aug. 17, 2010, the disclosures of which are hereby incorporated herein by reference.

FIELD OF THE DISCLOSURE

The present disclosure relates generally to wireless communications, and more specifically to carrier aggregation.

BACKGROUND

Carrier Aggregation will be used in 3GPP LTE networks to provide improved data rates to users, which are also referred to as a mobile station or as user equipment (UE). Carrier aggregation consists of transmitting data to or receiving data from a UE on multiple carrier frequencies ("component carriers"). The wider bandwidth enables higher data rates. The present disclosure considers the problem of change of the primary cell of a mobile station. For carrier aggregation (CA) operation, a UE can be configured with a set of serving cells. Each of the serving cells has a downlink frequency and may also have an uplink frequency. The downlink frequencies of the different serving cells of a UE are distinct and the uplink frequencies of a UE are distinct. In the case of a frequency division duplex (FDD) system, the downlink and uplink frequencies of a serving cell are distinct. In the case of a time division duplex (TDD) system, the downlink and uplink frequencies of a serving cell are the same. Carrier aggregation operation can also be described in terms of "component carriers" or "serving frequencies". The mobile station has a set of "downlink component carriers" or "downlink serving frequencies" (corresponding to the downlink frequencies of the serving cells) and uplink component earners or. "uplink serving frequencies" (corresponding to the uplink frequencies of the serving cells). In general, all the serving cells of a mobile station belong to the same base station (that is, all the downlink frequencies are transmitted from the same base station). However, there can be exceptions to this rule. For example, in a base station can transmit one or more downlink serving frequencies, while the remaining downlink serving frequencies are transmitted are transmitted by one or more remote base station equipment.

One of the serving cells is designated as a "primary cell". Correspondingly there are "downlink primary frequency" and "downlink primary component carrier" which refer to the downlink frequency of the primary cell, and "uplink primary frequency" and "uplink primary component carrier" which refer to the uplink frequency of the primary cell. A serving cell that is not a primary cell is referred to as a secondary cell.

The communication link between the mobile station and the primary cell is a primary link in the communication between the mobile station and the network. Specifically, at the time of connection establishment between the mobile station and the network, a bi-directional communication link between the mobile station and the primary cell is established before any communication link is established between the mobile station and a secondary cell.

Carrier Aggregation procedures are designed such that the mobile station transmits the uplink control channel only to the primary cell (i.e., only on the uplink primary frequency). The uplink control channel carries various control information such as ACK/NACK indicators for downlink transmission from all serving cells, Channel Quality Indicator (CQI) information for all serving cells and scheduling requests (SR). Thus any interruption of uplink transmissions from the mobile station to the primary cell effectively results in interruption of almost all downlink communication (including all user data communication) through all of the serving cells.

If the communication link between the mobile station and the primary cell is interrupted, the communication between the mobile station and the network fails even if the communication link between the mobile station and a secondary cell is sustained. The primary cell provides security and encryption related information to the mobile station. Furthermore, the mobile station performs radio link monitoring of the primary cell but not of the secondary cells. If the radio link monitoring of the primary cell indicates that there is a radio link problem, the mobile station suspends all reception and transmission of signals. If there is no recovery from the radio link problem, the mobile station declares a radio link failure, breaks the connection to the serving cells and attempts to re-establish the connection to the network through a suitable cell. Such actions can result in significant interruptions of the communication link and also in irrecoverable failure of the communication link.

Given the importance of the link between the mobile station and the primary cell, in order to minimize problems associated with radio link quality, it is necessary to ensure that the primary cell is the best cell of the serving cells. Such a requirement then makes it necessary to change the primary cell when the primary cell is no longer the best cell. Change of the primary cell can be achieved by emulating a handover procedure, wherein the source cell is the current primary cell and the target cell is the new primary cell. However, such a procedure has significant drawbacks. The handover procedure is designed for mobility—that is, for transferring a mobile station from a cell at a first base station (source cell) to a cell at a second base station (target cell). Thus, the mobile station has to perform synchronization to the target cell before communication via the target cell can resume. In 3GPP LTE, the synchronization is performed by a random access procedure, i.e., transmitting on a random access channel and receiving a random access response. The synchronization procedure results in a significant interruption. Since the interruption includes an interruption of uplink transmission to the primary cell, it results in interruption or suspension of all downlink data between the network and the mobile station (as described above). Furthermore, the various communication protocols (such as medium access control and radio link control) and in the mobile station have to be reset and re-established before communication can resume through the target cell. The security key is also changed at the handover. The re-establishment of the protocols and the change of the security key can result in loss of any buffered packets at both the base station and the mobile station.

Therefore it is beneficial to have procedures for change of primary cell that remedy the deficiencies outlined above.

DETAILED DESCRIPTION

A method for change of primary cell during carrier aggregation operation is disclosed that overcomes the deficiencies described above. The embodiments are described in terms of a 3GPP Long term Evolution (LTE) system. However, it should be clear that the invention and the embodiments are equally applicable to other wireless communication systems.

Figure 1:
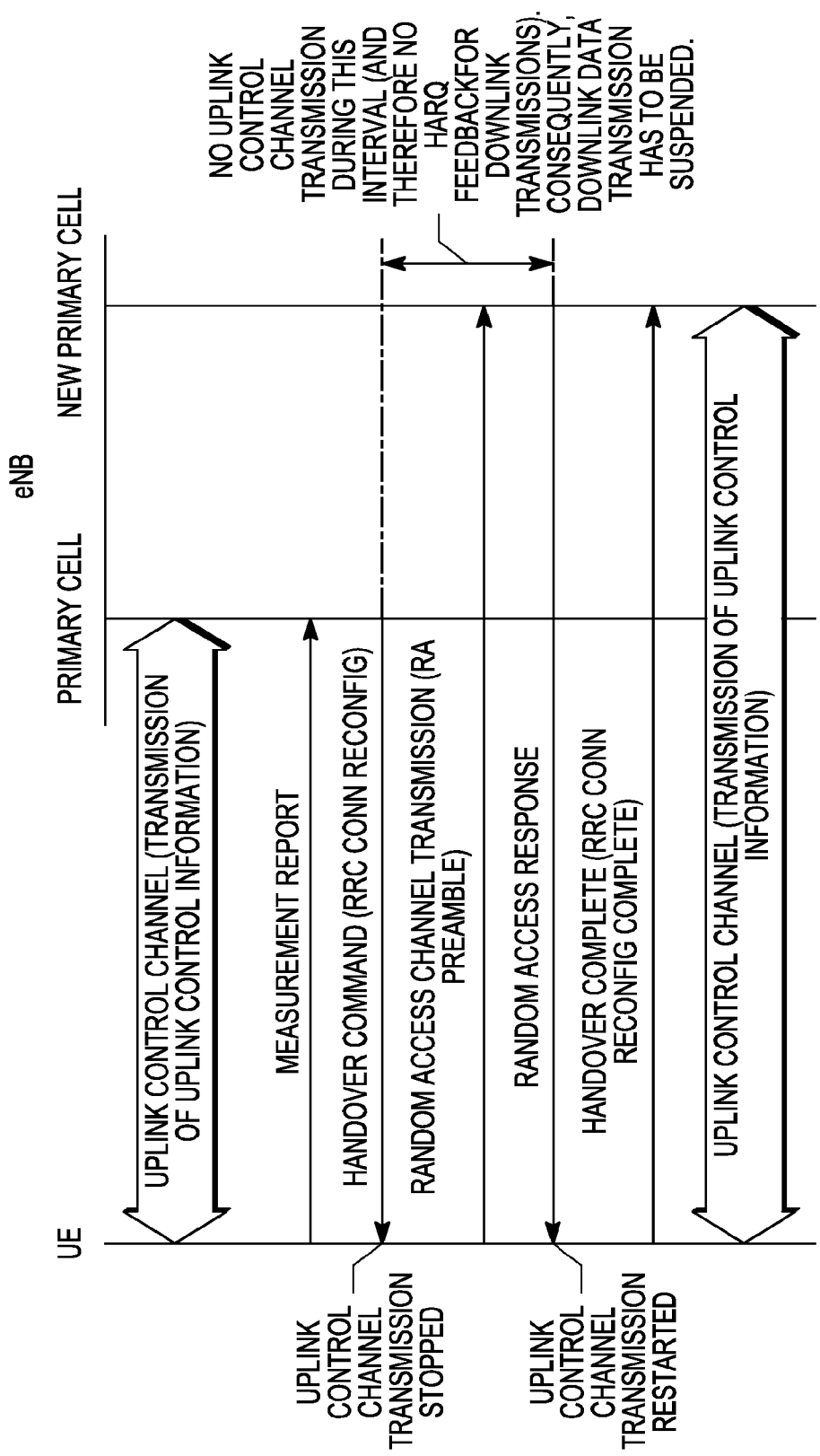
FIG. 1 shows the use of the handover procedure for change of the primary cell.
Figure 2:
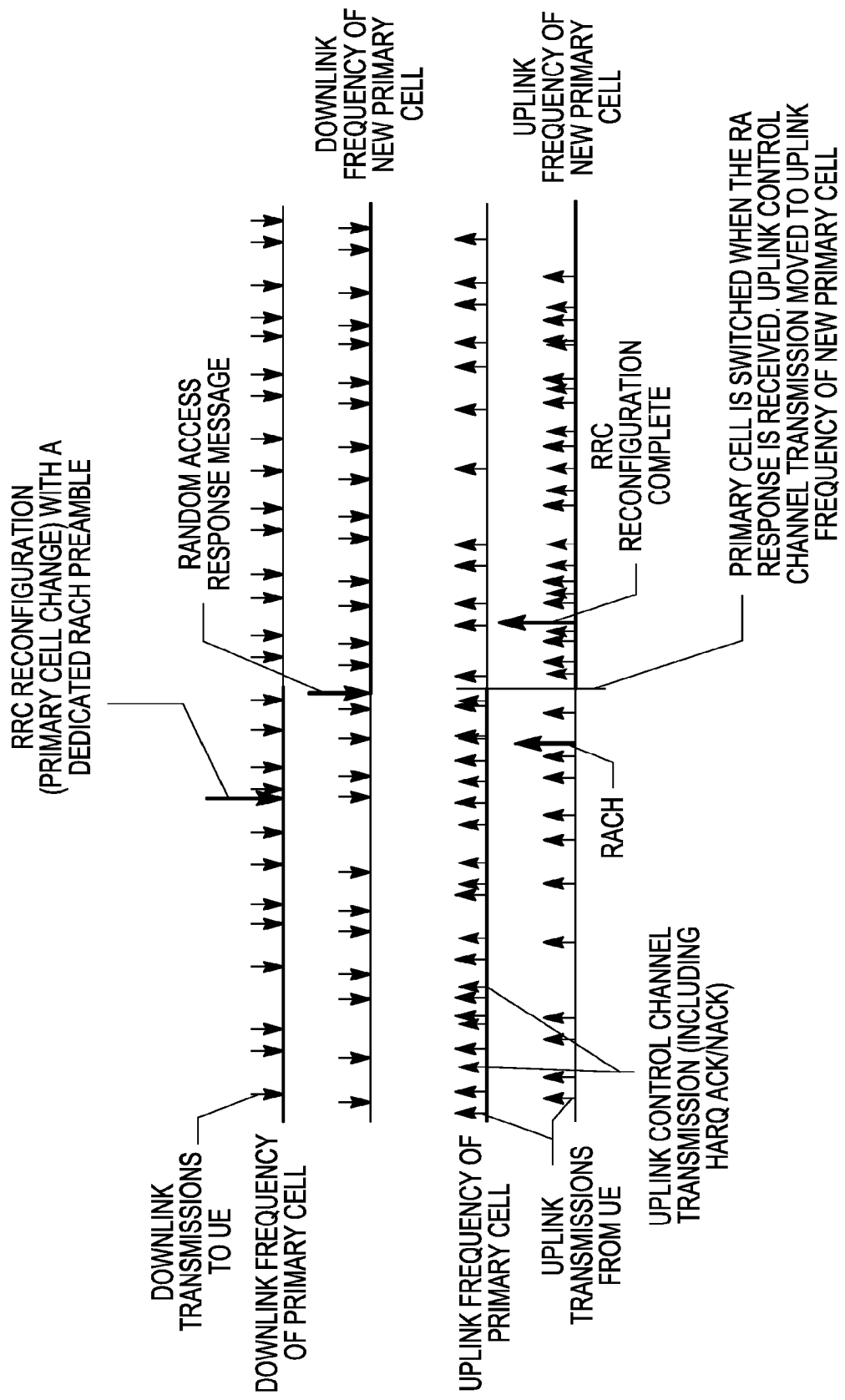
FIG. 2 illustrates a method for change of primary cell during carrier aggregation operation using a random access channel transmission.

According to a first embodiment, illustrated in FIG. 2, the base station transmits to the mobile station a primary cell change message instructing it to change the primary cell from the current primary cell to a new primary cell. The message can be a Radio Resource Control (RRC) message such as an RRC Connection Reconfiguration message, or any other suitable message. The message can indicate an identity of the new primary cell and can be addressed to the mobile station using a unique mobile station identifier. It can also be addressed to a group of mobile stations using an identifier for the group of mobile stations. The message can also include a configuration of a new uplink control channel to be used for transmitting uplink control information to the new primary cell. Alternatively, the mobile station can use a default configuration for a new uplink control channel to be used for transmitting uplink control information to the new primary cell. The message can also include a random access channel preamble to use for the primary cell change procedure. The primary cell change message can also include a new mobile station identifier. The new primary cell and the mobile station can use the new mobile station identifier for communication upon the changing the primary cell. Alternatively, if the base station can determine that the mobile station identifier used by the mobile station prior to the change of primary cell is not used for communication between the new primary cell and another mobile station, the mobile station can continue to use the same mobile station identifier before and after the primary cell change. The mobile station identifier can be a Cell Radio Network Temporary Identifier (C-RNTI) or another mobile station specific identifier.

The uplink control channel can be the physical uplink control channel or any other uplink control channel. The uplink control information can include one or more of ACK/NACK indicators for downlink transmission from one or more serving cells, Channel Quality Indicator (CQI) information for one or more serving cells and scheduling requests (SR).

The mobile station can transmit on a random access channel to the new primary cell, i.e., it can transmit on a random access channel on the uplink frequency of the new primary cell. The transmission on the random access channel can further include transmission of the random access channel preamble indicated in the primary cell change message. In response to the random access channel transmission, the base station can transmit a random access response message and the mobile station can receive the random access response message. Upon receiving the random access response message, the mobile station can start transmitting the uplink control channel on the uplink frequency of the new primary cell. The mobile station can send a response message to the primary cell change message indicating completion of the primary cell change procedure. The response message can be an RRC message such as an RRC Connection Reconfiguration Complete message, or any other suitable message.

The base station can select a suitable new primary cell from the set of serving cells. Alternatively, the base station can select a suitable new primary cell from among cells that are not serving cells. The selection of the new primary cell can be based on signal quality information available at the base station. For example, the base station can utilize measurement reports including Radio Resource Management (RRM) measurements sent by the mobile station. The selection of the new primary cell can also be based on the location of the mobile station. For example, if the base station is aware that at the location of the mobile station, a cell different from the current primary cell would provide a more reliable communication link, it can select such a cell as the new primary cell.

Upon receiving the primary cell change message, the mobile station can continue transmission on the uplink control channel to the (current) primary cell until the mobile station receives the random access response message. Upon receiving the random access response message, the mobile station can stop transmission of the uplink control channel to the (current) primary cell and start transmission of the uplink control channel to the new primary cell. This ensures that there is no interruption of the uplink control information transfer and consequently there is no interruption of the downlink transmissions from any of the serving cells. The mobile station can receive a downlink transmission subsequent to the reception of the primary cell change message. Such a downlink transmission can include user data, signaling data or any other data requiring the transmission of uplink control information (such as a HARQ ACK/NACK indication) by the mobile station. The mobile station can transmit, subsequent to receiving the random access response, an uplink control channel to the new primary cell in response to the downlink transmission received subsequent to the reception of the primary cell change message. The transmission of the uplink control channel can include the transmission of the HARQ ACK/NACK indication corresponding to the downlink transmission received subsequent to the reception of the primary cell change message.

Alternatively, the mobile station can stop transmission of the uplink control channel to the (current) primary cell when it receives the primary cell change message. It can resume transmission of the uplink control channel to the new primary cell upon reception of the random access response message. Although this causes an interruption of the uplink control information transfer, the interruption is significantly smaller than in the case of the handover procedure.

Upon transmitting the random access response message, the base station can start monitoring the uplink frequency of the new primary channel for the uplink control channel transmission from the mobile station to the new primary cell. The base station can continue to monitor the uplink frequency of the (current) primary channel for the uplink control channel transmission from the mobile station to the (current) primary cell. If the base station does not detect valid transmissions of an uplink control channel from the mobile station to the new primary cell, or if the base station does not receive a message indicating successful completion of the primary cell change procedure, it can continue to use the (current) primary cell as the primary cell. Alternatively, upon transmitting the random access response message, the base station can start monitoring the uplink frequency of the new primary channel for the uplink control channel transmission from the mobile station to the new primary cell and stop monitoring the uplink frequency of the (current) primary channel for the uplink control channel transmission from the mobile station to the (current) primary cell.

If the base station does not detect a valid uplink control channel transmission from the mobile station to the new primary cell, it can retransmit the random access response. Alternatively, if the base station does not detect a valid uplink control channel transmission from the mobile station to the new primary cell, it can retransmit the primary cell change message to the mobile station.

Figure 3:
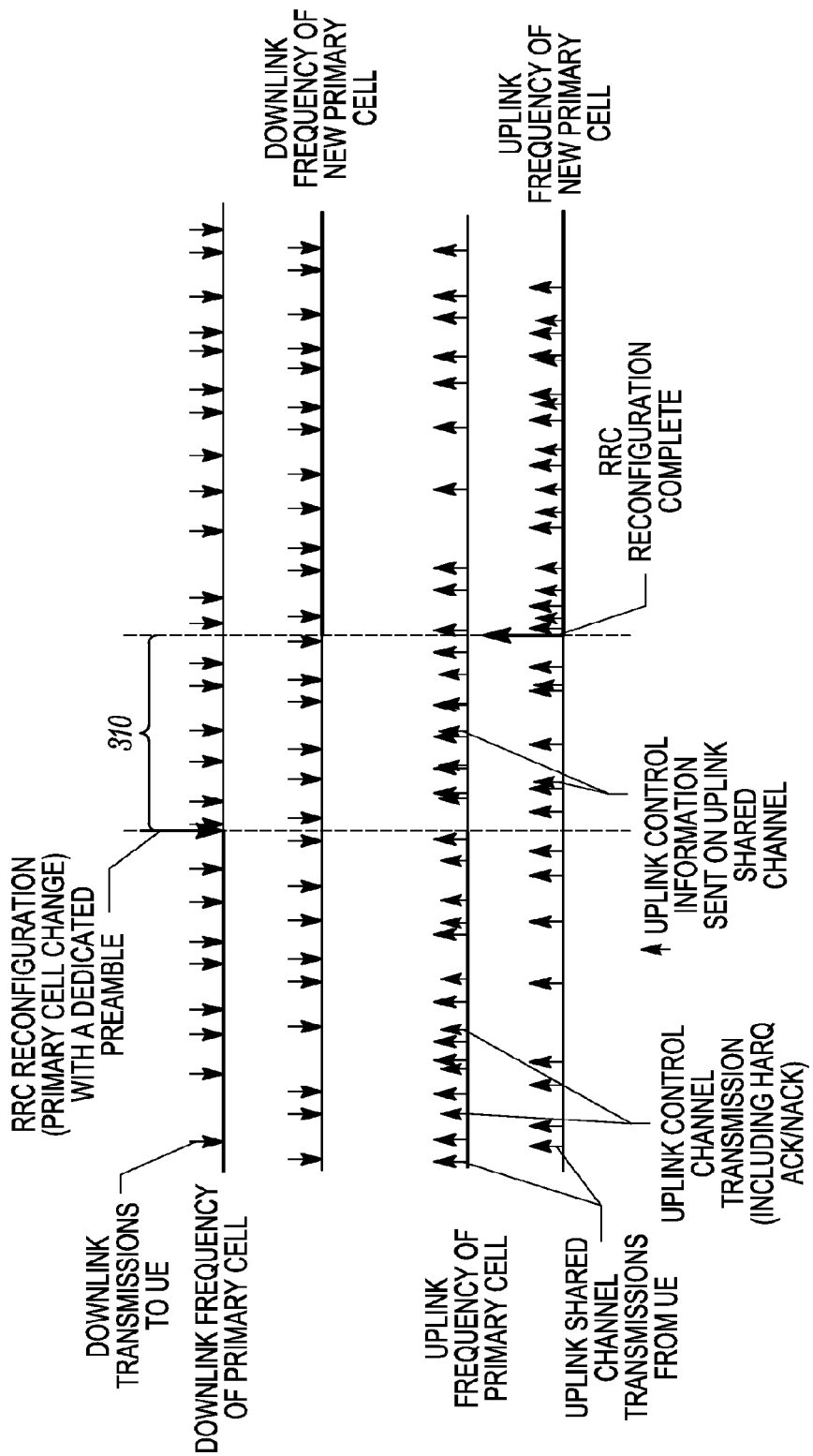
FIG. 3 illustrates a method for change of primary cell during carrier aggregation operation without using a random access channel transmission.

According to another embodiment, illustrated in FIG. 3, the base station transmits to the mobile station a primary cell change message instructing it to change the primary cell from the current primary cell to a new primary cell. The message can be a Radio Resource Control (RRC) message such as an RRC Connection Reconfiguration message, or any other suitable message. The message can indicate an identity of the new primary cell and can be addressed to the mobile station using a unique mobile station identifier. It can also be addressed to a group of mobile stations using an identifier for the group of mobile stations. The message can also include a configuration of a new uplink control channel to be used for transmitting uplink control information to the new primary cell. Alternatively, the mobile station can use a default configuration for a new uplink control channel to be used for transmitting uplink control information to the new primary cell. The primary cell change message can also include a new mobile station identifier. The new primary cell and the mobile station can use the new mobile station identifier for communication upon the changing the primary cell. Alternatively, if the base station can determine that the mobile station identifier used by the mobile station prior to the change of primary cell is not used for communication between the new primary cell and another mobile station, the mobile station can continue to use the same mobile station identifier before and after the primary cell change. The mobile station identifier can be a Cell Radio Network Temporary Identifier (C-RNTI) or another mobile station specific identifier.

Upon receiving the primary cell change message, the mobile station can release a configuration of an uplink control channel. The release of the configuration of the uplink control channel can include at least one of release of any time-frequency resources associated with the uplink control channel, and resetting of any stored parameters associated with the uplink control channel.

The release of the configuration of the uplink control channel can also include modifying the configuration of the mobile station such that the uplink control channel cannot be transmitted. The release of the configuration of the uplink control channel can also include modifying the configuration of the mobile station such that the uplink control channel is transmitted at a very low power level or a zero power level. The release of the uplink control channel can also include suspension of transmission of part or all of the uplink control information using the resources associated with the uplink control channel. The uplink control channel can be the physical uplink control channel or any other uplink control channel. In FIG. 3, at 310, no uplink control channel resources are transmitted during this interval. Uplink control information must be sent on an uplink shared channel. The eNB must ensure that in any subframe where uplink control information is expected there is at least one uplink shared channel resource grant on any of the serving cells. For example, in each subframe with a downlink transmission to the UE there must be a shared uplink resource channel grant on one of the uplink control channels.

The mobile station can transmit uplink control information on an uplink shared channel. The uplink control information can include one or more of ACK/NACK indicators for downlink transmission from one or more serving cells, Channel Quality Indicator (CQI) information for one or more serving cells and scheduling requests (SR). The mobile station can configure a new uplink control channel for transmission to the new primary cell. The configuration of the new uplink control channel can be according to a configuration of a new uplink control channel indicated in the primary cell change message. Alternatively, the configuration of the new uplink control channel can be according to a default uplink control channel configuration. The default uplink channel configuration can be a copy of the uplink control channel configuration at the primary cell before the primary cell change message transmission.

Upon configuring the new uplink control channel, the mobile station can send a response message to the primary cell change message indicating completion of the primary cell change procedure. The response message can be an RRC message such as an RRC Connection Reconfiguration Complete message, or any other suitable message. The mobile station can then start transmission of the new uplink control channel to the new primary cell. The transmission of the new uplink control channel can include transmission of one or more of ACK/NACK indicators for downlink transmission from one or more serving cells, Channel Quality Indicator (CQI) information for one or more serving cells and scheduling requests (SR).

Upon transmitting the primary cell change message, the base station can ensure that the mobile station is provided resources for transmission of an uplink shared channel whenever uplink control information is expected from the mobile station. The base station can provide such resources until a message indicating completion of the primary cell change procedure is received from the mobile station. The base station can provide such resources by means of an "uplink resource grant" or an "uplink grant". The uplink resource grant can be signaled to the mobile station whenever any uplink control information is expected from the mobile station. For example, an uplink resource grant can be signaled to the mobile station whenever a HARQ ACK/NACK indication in response to a downlink transmission to the mobile station is expected from the mobile station. The base station can signal the uplink resource grant in conjunction with any downlink data transmission for the mobile station, such any physical downlink shared channel transmission to the mobile station. The uplink resource grant can signal resources on the uplink of any of the serving cells. Furthermore, the uplink resource grant can signal a set of persistent time frequency resources.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

It will be appreciated that some embodiments may utilize one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/ or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a base station for receiving uplink control information from a mobile station during carrier aggregation operation, the method comprising:
   the base station configuring a first uplink control channel for transmitting uplink control information from the mobile station to a first primary cell, the first primary cell being one of a first group of serving cells used in carrier aggregation communication between the base station and the mobile station:
   configuring one or more uplink shared channels for receiving uplink data; transmitting a message to the mobile station indicating a change of primary cell to a second primary cell, the second primary cell being one of a second group of serving cells used in carrier aggregation communication between the base station and the mobile station, wherein the message indicating the change of primary cell comprises at least one of configuration information for a second uplink control channel for transmitting uplink control information from the mobile station to the second primary cell and a new mobile station identifier;
   monitoring uplink control information from the mobile station exclusively on the one or more uplink shared channels;
   receiving via one or more of the uplink shared channels a message from the mobile station indicating successful change of the primary cell from the first primary cell to the second primary cell; and
   monitoring, in response to receiving the message from the mobile station indicating successful change of the primary cell, the second uplink control channel from the mobile station to the second primary cell.

2. The method according to claim 1 further comprising:
   determining, subsequent to transmitting the message indicating a change of primary cell, that uplink control information is expected from the mobile station; and
   signaling an uplink resource grant, the uplink resource grant assigning resources to the mobile station on one of the one or more uplink shared channels.

3. The method according to claim 1 further comprising suspending, subsequent to transmitting the message indicating a change of primary cell, monitoring of the first uplink control channel from the mobile station to the first primary cell.

4. The method according to claim 2 wherein the step of signaling is performed before change of the primary cell is complete.

5. The method according to claim 1 wherein the first group of serving cells and the second group of serving cells are the same.

6. The method according to claim 1 wherein first group of serving cells and the second group of serving cells are different.

* * * * *